United States Patent [19]

Jones et al.

[11] Patent Number: 4,979,339
[45] Date of Patent: Dec. 25, 1990

[54] PROTECTIVE COVER WITH HOLD-DOWNS

[76] Inventors: Frederick L. Jones, 1401 SE., 15th St., #213; Ghislaine M. Morrissette, 1777 SE., 15th St., #101, both of Ft. Lauderdale, Fla. 33316

[21] Appl. No.: 494,935

[22] Filed: Mar. 14, 1990

Related U.S. Application Data

[63] Continuation of Ser. No. 296,321, Jan. 11, 1989, abandoned, which is a continuation-in-part of Ser. No. 117,969, Nov. 9, 1987, abandoned.

[51] Int. Cl.⁵ .............................................. B60J 11/00
[52] U.S. Cl. .......................................... 52/3; 296/136; 150/166; 248/500; 135/88
[58] Field of Search ............... 296/136, 98; 160/349.1; 150/166; 294/27.1, 31.2; 135/88, 120; 215/228, 101, 100 A, 100 R; 248/231.6, 500, 506; 43/43.14; 24/230.5 W, 237; 119/107; 272/117; 52/3, 4

[56] References Cited

U.S. PATENT DOCUMENTS

| 19,689 | 3/1858 | Dinsmoor | 52/4 |
| 358,195 | 2/1887 | Griswold | 52/3 |
| 1,448,811 | 3/1923 | Morrison | 160/349.1 X |
| 2,026,950 | 1/1936 | Miller | 215/100 R |
| 2,799,882 | 7/1957 | Falk | 215/101 |
| 3,000,527 | 9/1961 | Jennings et al. | 215/100 A |
| 3,036,371 | 5/1962 | Gray et al. | 215/100 A X |
| 3,162,920 | 12/1964 | Durham | 52/4 |
| 3,612,595 | 10/1971 | Updegraff | 215/100 A X |
| 3,620,410 | 11/1971 | Griese | 215/100 A X |
| 3,664,070 | 5/1972 | Golay | 52/4 |
| 3,982,755 | 9/1976 | Sarich | 272/117 |
| 3,990,596 | 11/1976 | Hoftman | 215/100 A |
| 4,357,042 | 11/1982 | Gall | 215/100 A X |
| 4,368,826 | 1/1983 | Thompson | 215/100 A |
| 4,580,372 | 4/1986 | Osborn | 52/3 |

FOREIGN PATENT DOCUMENTS

| 2322478 | 11/1974 | Fed. Rep. of Germany | 215/100 A |
| 387197 | 7/1908 | France | 52/3 |
| 2291097 | 7/1976 | France | 215/100 A |
| 144112 | 6/1920 | United Kingdom | 52/3 |
| 644405 | 10/1950 | United Kingdom | 52/4 |

Primary Examiner—Dennis H. Pedder
Attorney, Agent, or Firm—Victor F. Volk

[57] ABSTRACT

A fabric automobile cover is connected by elastic cords to used plastic bottles that have been refilled with water, to hold it down.

9 Claims, 3 Drawing Sheets

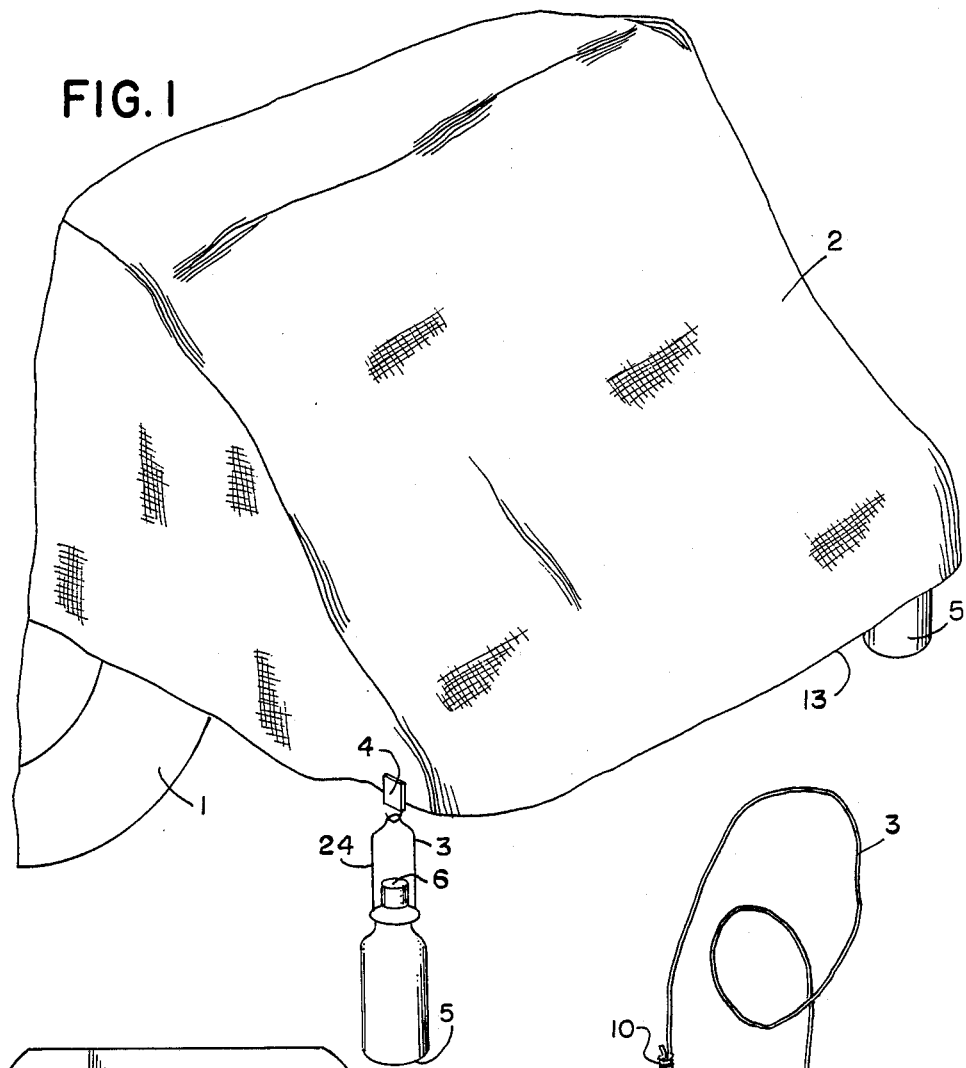
FIG. 1
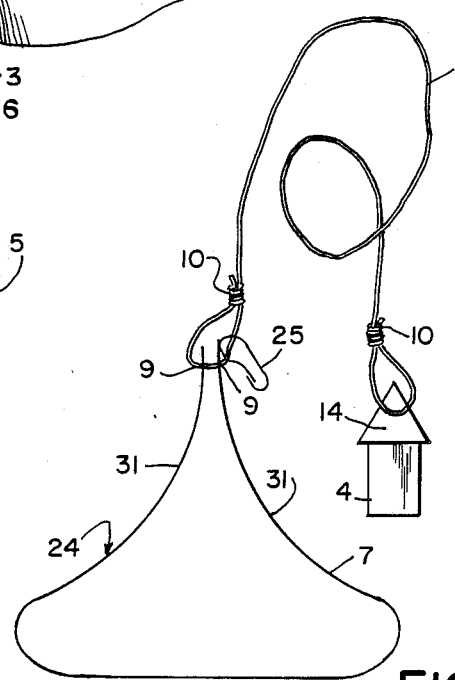
FIG. 7
FIG. 8

FIG. 5
FIG. 6
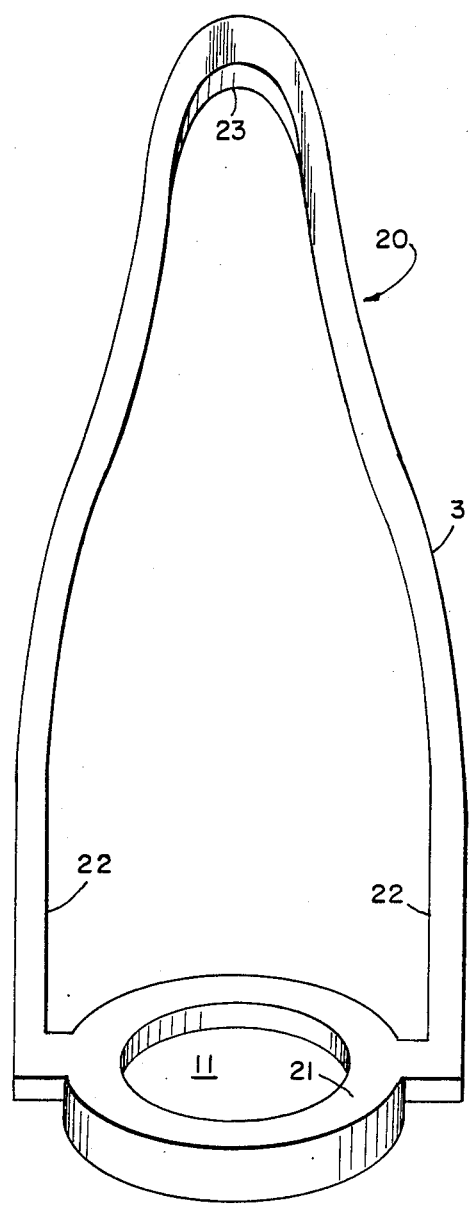
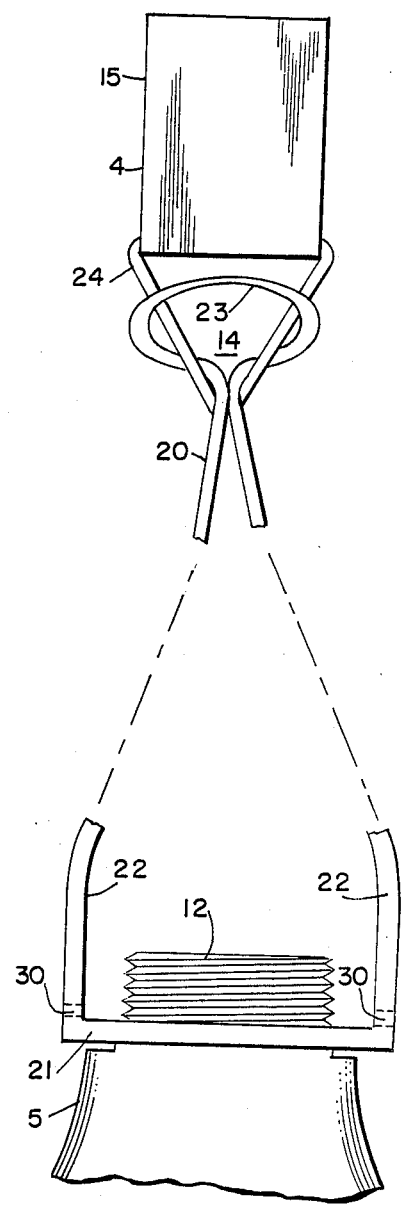

PROTECTIVE COVER WITH HOLD-DOWNS

This application is a continuation of copending application 07/296,321, filed Jan. 11, 1989, now abandoned, which is a continuation in part of copending application serial number 07/117,969 filed Nov. 9, 1987, now abandoned.

BACKGROUND OF THE INVENTION

This invention relates to coverings for protecting the surface of automobiles and more particularly to the means for holding said coverings in place in resistance to wind forces when the covered cars are left unattended.

Fabric covers in current use generally employ cords for gathering the lower margins of the cover below the lowermost edge of the car body or forming a chord beneath each corner of the car body. Alternatively, cords attached to the lowermost edge of the cover are tied beneath the car body or to the lower edge of the car body or to various attaching means fastened to the car body. These various holding means have been ineffective and awkward to use and often tear away at the point of attachment to the cover under the force of sudden gusts of wind.

SUMMARY OF THE INVENTION

It is accordingly an object of the invention to provide improved means for holding car covers in place that are convenient and easy to use, both when putting said covers in place and when removing them after use.

The hold down means of the invention employs the force of gravity to hold the cover in place. Weights are removably attached at the lowermost edges of the car cover to hold it in place. By making the weights individually detachable, they may be handled separately from the cover and from each other so that the cover may be installed or removed with ease and a large combined weight may be installed or removed with ease by handling one weight at a time.

Convenient attaching and detaching means are provided to further facilitate the operation of the improved car cover. These may be simple suspender clips.

To reduce the cost of manufacture and shipping, the hold down means employs refillable ordinary plastic bottles that may be filled with water, sand, and the like by the user and these bottles may be supplied by the user. Because the cover is held down by individual weights and not rigid connections, a gust of wind will lift the weight instead of tearing a tie out of the fabric, an elastic member connecting the weight to the cover further reduces the stresses upon the fabric from a sudden gust of wind.

BRIEF DESCRIPTION OF THE DRAWINGS

FIG. 1 is a perspective view of a portion of an automobile with cover held in place by the invention.

FIG. 5 is a perspective view of an alternative embodiment showing a molded elastomeric part.

FIG. 6 is a front elevation view of the embodiment of FIG. 5 with clip attached in place on a bottle.

FIG. 7 is a top view of a sling of another embodiment of the invention.

FIG. 8 is a side elevation view of the sling of FIG. 7 connected to a suspender clip by a swaged elastic cord.

DETAILED DESCRIPTION OF PREFERRED EMBODIMENTS

Figure 2:
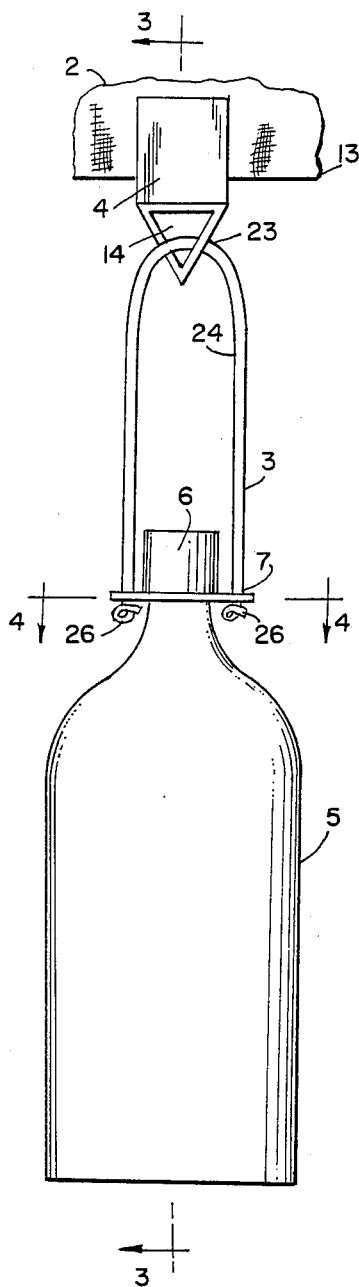
FIG. 2 is a front elevation detail view of a portion of FIG. 1 including the hold down of the invention and a portion of the car cover.
Figure 3:
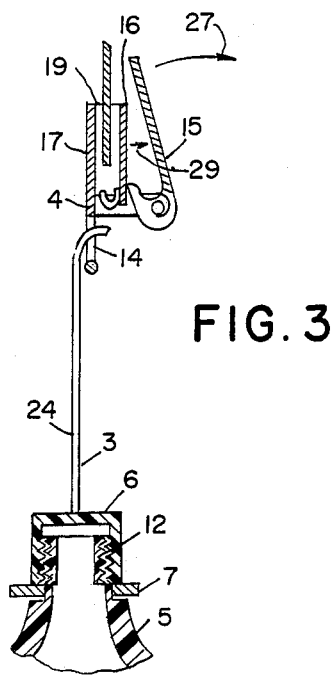
FIG. 3 is a cross sectional view through 3—3 of FIG. 2.
Figure 4:
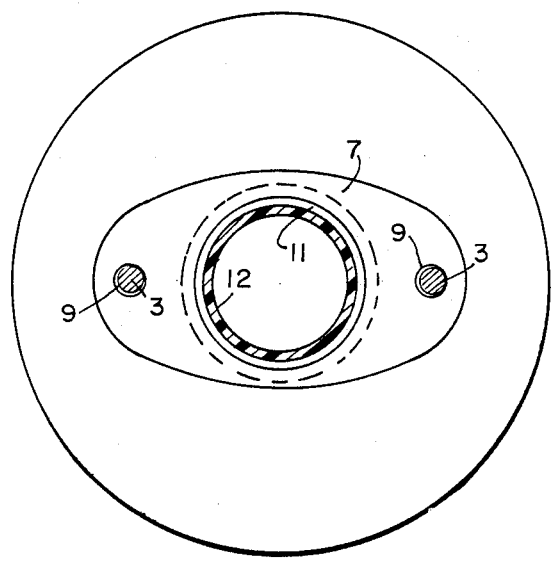
FIG. 4 is a cross sectional view through 4—4 of FIG. 2.

Referring now first to FIG. 1, an automobile 1 is shown covered by a car cover 2. The cover 2 is held down by detachable hold down devices 24 of the invention comprising a bottle 5 standing, as shown in the figure, on its flat bottom while filled with water, sand, gravel and the like to provide weight. The bottle is a common plastic bottle with screw cap such as may be used for oil, soda pop and the like. The weighted bottle becomes a car cover hold down device 24 by means of a collar or sling element 7 (FIGS. 2-4) with a central aperture 11 that fits snugly over the screw threaded neck 12 of bottle 5 and is held in place by the screw cap 6. The collar or sling 7 has two holes 9 for attaching elastic cord 3 that pass through holes 9 and are held in place by knots 26 or other fastening means well known in the art such as staples, eyelets and the like. The cord forms a loop 23 that passes through aperture 14 in clip 4 that removably attaches to the car cover 2 at lower margin 13 which, as shown in FIG. 1, is substantially lower than the top of the cover 2. The preferred clip or removable attaching means is the toggle-action clip shown here which is generally known as a suspender clip. It is very inexpensive, has positive gripping action and does not tear the fabric. A toggle lever 15, when moved in the direction shown by arrow 27, causes moving jaw 16 to move away from stationary jaw 17 and teeth 19 release fabric of cover 2 so that the weighted bottle 5 may be removed as a unit. After each hold down 24 is removed from cover 2, the cover may be conveniently removed. This is much easier than removing the cover with attached weights or untying cords as in the prior art. The process is reversed for installing the cover with hold downs. The elastic cord 3 is a yielding attachment for the weight so that a sudden gust of wind puts a less abrupt force on the clip. Furthermore, a forceful wind will lift the weight instead of tearing the fabric. FIGS. 5 and 6 show an embodiment of the device 24 in which the collar 21 and the elastic cord 3 are molded of an elastomeric compound in one piece with arms 22 joining collar 21 and forming loop 23 that is conveniently looped around the clip 4 without any other fastening means. The arms 22 bend up at bends 30. FIGS. 7 and 8 illustrate an alternative embodiment in which sling or collar 7 has holes 9 for closely fitting cord 3 (FIG. 4) on lateral extensions or ears 31 that can be folded upward over the top of the bottle and together to receive a loop of cord 3. Another loop engages clip 4 through aperture 14. The loops as shown here are secured by swages 10, although other securing means may be employed. An optional accessory spring clip 25 may be provided to enable the cord 3 to be secured to the handle of a molded plastic jug for a heavier weight.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

We claim:

1. A hold-down device for providing a protective cover, said hold down device comprising:
   (a) a protective fabric cover and a weight-filled plastic beverage bottle comprising a screw cap,
   (b) positive cover clamping means for engaging and disengaging said cover,
   (c) collar means including a central aperture means for receiving the neck of said bottle, said aperture means being of a size to admit said neck but not said screw cap to provide for captively holding said collar means on said bottle when said bottle is closed by said screw cap, and
   (d) means comprising elongate elastic cord means connecting said clamping means to said collar means to provide an elastic holding down of said edge when said bottle contains weighty matter and said clamping means is attached to said cover, said collar means comprising walls defining holes therein closely fitting said connecting means.

2. The hold down device according to claim 1, in which said clamping means is a toggle clamp.

3. The hold down device according to claim 1, in which said clamping means is a suspender clip.

4. The hold down device according to claim 1, in which said collar means and said elongate elastic cord means are formed of an elastomeric material in one piece.

5. The hold down device according to claim 1, in which said collar means includes elongate side extensions with connecting means for connecting to said elastic cord means.

6. The hold down device according to claim 3, in which said collar means includes elongate side extensions with connecting means for connecting to said elastic cord means.

7. The hold down device according to claim 4, in which said clamping means is a suspender clip.

8. The hold down device according to claim 7, in which said elastic core means includes a loop for connecting said clamping means.

9. A hold-down device for providing protective covering comprising:
   (a) a protective fabric cover comprising an upper portion being supported by an object being covered and a circumscribing edge of said cover, said edge being suspended by gravity a substantial distance below said upper portion,
   (b) a plurality of cord means, said cord means being attached at spaced intervals around said edge,
   (c) a like plurality of refillable plastic beverage bottles comprising integral threaded necks and flat bottoms, said bottles being weighted with water and supported on said bottoms,
   (d) a like plurality of threaded caps, said caps fitting said necks,
   (e) collar means comprising holes closely fitting said cord means and engaging said cord means against said caps thereby preventing the lifting of said cover.

* * * * *

UNITED STATES PATENT AND TRADEMARK OFFICE
CERTIFICATE OF CORRECTION

PATENT NO. : 4,979,339

DATED : Dec. 25, 1990

INVENTOR(S) : Jones et al.

It is certified that error appears in the above-identified patent and that said Letters Patent is hereby corrected as shown below:

Claim 1, line 3, after "cover" insert --comprising a circumscribing edge thereof--

Signed and Sealed this

Second Day of February, 1993

Attest:

STEPHEN G. KUNIN

Attesting Officer

Acting Commissioner of Patents and Trademarks